United States Patent [19]

Cooper et al.

[11] 4,436,795
[45] Mar. 13, 1984

[54] ALKALINE ELECTRIC STORAGE CELLS

[75] Inventors: Michael J. Cooper, Redditch; James Parker, Alvechurch, all of England

[73] Assignee: Chloride Group Public Limited Company, London, England

[21] Appl. No.: 398,433

[22] Filed: Jul. 14, 1982

[30] Foreign Application Priority Data

Jul. 17, 1981 [GB] United Kingdom ............ 8122088

[51] Int. Cl.³ .................................. H01M 10/52
[52] U.S. Cl. ................................ 429/53; 429/59
[58] Field of Search .............. 429/59, 60, 53, 54, 429/57

[56] References Cited

U.S. PATENT DOCUMENTS

| | | | |
|---|---|---|---|
| 2,988,584 | 6/1961 | Peters | 429/59 |
| 3,022,363 | 2/1962 | Grieger | 429/60 |
| 3,350,225 | 10/1967 | Seiger | 429/59 |
| 4,320,181 | 3/1982 | Habich et al. | 429/59 |

FOREIGN PATENT DOCUMENTS

| | | | |
|---|---|---|---|
| 514977 | 7/1955 | Canada | 429/60 |
| 741345 | 11/1955 | United Kingdom | 429/60 |

*Primary Examiner*—Donald L. Walton
*Attorney, Agent, or Firm*—Oblon, Fisher, Spivak, McClelland & Maier

[57] ABSTRACT

An alkaline electric storage cell comprises a container within which are positive and negative pocket plates separated by composite separators. Each separator has a lower portion which is of conventional ladder type having a substantially open area and an upper portion which is a strip of absorbent fibrous material. The cell is filled with electrolyte up to a level which is slightly above the bottom of the strips. The high discharge rate voltage of the cell is scarcely impaired by comparison with a conventional cell, but the oxygen that is evolved at the end of charge is recombined at those portions of the negative plates which are above the electrolyte level but retained moist with electrolyte by the absorbent strips. The cell thus loses no electrolyte and is of no-maintenance type at charging rates of up to C/60 or more.

14 Claims, 3 Drawing Figures

ALKALINE ELECTRIC STORAGE CELLS

BACKGROUND OF THE INVENTION

The present invention relates to electric storage cells of alkaline type and is concerned with such cells, or batteries made up from such cells, which are of sealed type. During operation, and more particularly during the latter stages of charging, gases, normally hydrogen and/or oxygen, are liberated in such cells, and the term "sealed" designates a cell which has no vent for the release of such gas at atmospheric pressure. This term is not used to exclude the provision of a safety valve or of a vent which opens to vent the interior of the cell at some predetermined pressure above atmospheric pressure.

The evolution of gas from the positive or negative plates occurs primarily on charging when those plates are fully charged and oxygen is liberated at the positive plates whilst hydrogen is liberated at the negative plates. It is found that evolved oxygen can pass to the negative plates, which includes cadmium in a nickel/cadmium cell, and tend to recombine there and thus not contribute to an increase in pressure of the cell. In so doing it partially discharges the negative plates and suppresses hydrogen evolution. If hydrogen is evolved it does not tend to recombine similarly and for this reason it is usual in such cells to provide an excess of negative active material so that the positive plates become charged before the negative plates and thus in practice little or no hydrogen is evolved.

It is desirable that as high a proportion as possible of the oxygen evolved in the cell be induced to recombine within the cell since a loss of oxygen and accompanying hydrogen represents a loss of electrolyte which must be compensated for by topping up the electrolyte. However, the conditions which promote effective recombination of the oxygen militate against the effective electrochemical operation of the cell at high rates of discharge.

In conventional pocket plate alkaline cells which are fully flooded with electrolyte, adjacent plates are separated by separators whose sole function is to space the plates apart thus preventing short circuits and do not have the subsidiary functions associated with the separators in lead acid cells, namely to prevent the shedding of active material and to inhibit "treeing through", that is to say the growth of lead dendrites from the plates which can ultimately lead to shortcircuits. Thus in such alkaline cells the separators conventionally have as large as possible an open area as in consistent with preventing contact of the plates so as to minimise the electrical resistance between adjacent plates. This resistance is largely responsible for the internal resistance of the cell and it must be kept as low as possible if the battery is to be efficient and is to have an acceptable high rate discharge performance.

Recombination of oxygen on a negative plate occurs by diffusion of oxygen through the layer of electrolyte present on the surface of the plate. The rate at which recombination can occur is therefore dependent upon the rate at which oxygen can diffuse through this layer and this in turn is dependent upon the thickness of this layer. Thus, in a fully flooded cell with a layer of electrolyte between the plates of the order of 1 mm–2 mm thick, the rate of recombination is very low. In a conventional sealed cell the recombination rate is increased substantially be using an electrolyte absorbent separator which is just moist with electrolyte. By this means the thickness of the layer of electrolyte covering the negative plate is kept very small and large rates of recombination can be sustained. However, this absorbent type separator has a much lower open area than that of a conventional flooded cell and therefore has a much higher resistance. In consequence a pocket plate cell with an absorbent separator has a high rate discharge voltage some 200–300 mV lower than a cell with a conventional separator, even when the former separator is in the fully saturated condition.

It is therefore an object of the invention to provide an electric storage cell of alkaline type in which substantially all the gas evolved within the cell is induced to recombine, at least at relatively low charging rates of, for instance between C/60 and C/1000, but whose performance is not substantially degraded by comparison with similar cells of the same volume.

SUMMARY OF THE INVENTION

According to the present invention an electric storage cell of alkaline type comprises a container within which is free electrolyte and a plurality of alternate positive and negative electrodes, the electrochemical capacity of the negative electrodes being greater than that of the positive electrodes, the lower portions of adjacent electrodes being separated by first separator means which leaves a substantially unobstructed path between the electrodes and the upper portions of adjacent electrodes being separated by second separator means comprising absorbent material, the normal electrolyte level within the container being between the tops of the negative electrodes and the bottom of the second separator means.

Thus in the cell according to the present invention each part of adjacent plates is separated from the adjacent plate by a separator which is the optimum as regards the desired performance of that part of the plates. Those parts of the plates which are below the electrolyte level and whose function is thus almost entirely electrochemical are separated by a separator having conventional characteristics, that is to say as large as possible an open area to minimise the resistance. Thus the first separation means may be the conventional rod or pin type in which separate spaced rods engage in grooves in adjacent plates and space them apart or of ladder type comprising a rectangular frame traversed vertically by several intermediate members. Alternatively, the first separation means may be thin plastics grid or net, a high percentage of whose area is open. Plastics net sold under the Trade Mark NETLON is suitable for this purpose. Those parts of the plates which are above the electrolyte level and whose function is thus electrochemical and also, in the case of the negative plates, to act as a site for the recombination of oxygen are separated by absorbent separator material whose lower edge dips down into the electrolyte. The upper portions of the plates are thus kept moist with electrolyte and can serve both functions. The type of absorbent separator used is not critical provided that it is inert to the electrolyte, potassium hydroxide in the base of a nickel/cadmium cell, and has a sufficiently high wicking capability to ensure an adequate supply of electrolyte to those parts of the plates which are out of the electrolyte. Felted or microporous polypropylene or nylon or resin coated microfine glass fibres have been found to be suitable.

Those parts of the plates which are separated by the absorbent separator material will exhibit a slightly reduced electrochemical performance. Whilst this is within wholly acceptable bounds, the area of the plates which is so separated is kept to a minimum, consistent with the desired rate of gas recombination, and is preferably in the range 5 to 25% of the active area of the plates. For example, the area of the plates which is so separated may be three pockets out of seventeen if the plates are of the perforated pocket type. In order to reduce the proportion of the plates that must be above the electrolyte level to achieve satisfactory gas recombination, it is preferred that the negative electrodes have a larger area than the positive electrodes above the electrolyte level on which recombination can occur. This can be achieved simply if the electrodes are of pocket type by providing the negative electrodes with one more pocket than the positive electrodes. In this case the additional pocket will be opposite the positive plate lug and the absorbent separator is extended up between the pocket and the separator to provide the former with adequate electrolyte.

The first separator means preferably has an open area in excess of 75% and more preferably in excess of 90% of its total area and preferably spaces adjacent plates apart by between 0.1 and 2 mm with the result that the resistance between adjacent plates is very low indeed. Whilst the first and second separator means may be separae items, it is preferred for ease of assembly that they be connected together to form a composite separator. This may be achieved by connecting absorbent separator material in the form of a single layer or a sleeve to the top of a conventional full height separator, e.g. of ladder type. This will however slightly increase the spacing between adjacent electrodes and thus the interelectrode resistance, and it is therefore preferred that the composite separator has the form of a conventional separator with its upper portion absent and replaced by the absorbent material. Alternatively it would be possible to connect the absorbent separator material to the upper portions of the electrodes or to sleeve the upper portion of every alternate electrode with absorbent separator material.

As referred to above, there is an excess of negative active material to ensure that oxygen is preferentially liberated, and it is preferred that this excess be between 5 and 100%. The precise excess that is required to ensure that substantially no hydrogen is evolved will partially depend on the charging regime to which the battery is subjected, and it is therefore preferred that, at the point in charging when gassing starts, the charging rate is a low one, e.g. less than C/60. A suitable charging regime is one given by a constant potential charger in which the current automatically drops towards the end of the charge.

If the charging rae is too high or the cell is subjected to a sustained overcharge, oxygen may be evolved at a rate higher than that at which it can be recombined. This will lead to a rise in pressure in the cell which would tend ultimately to rupture the cell. To ensure that this cannot occur, the cell is preferably provided with a vent, which can be of Bunsen type. Due to the fact that the gas recombination is not required at a high rate and is thus not dependent on a high pressure, as in many previous sealed cells, the vent is preferably constructed to vent the cell at a pressure of between 0.05 and 0.5 bar. This means that the cell container does not have to be constructed to withstand high internal pressures and can thus be of correspondingly light construction and made of plastics material such as polypropylene, polystyrene or alkyl butyl styrene.

Further features and details of the invention will be apparent from the following description of one specific embodiment of the invention which is given by way of example with reference to the accompanying diagrammatic drawings in which:

DESCRIPTION OF THE PREFERRED EMBODIMENT

Figure 1:
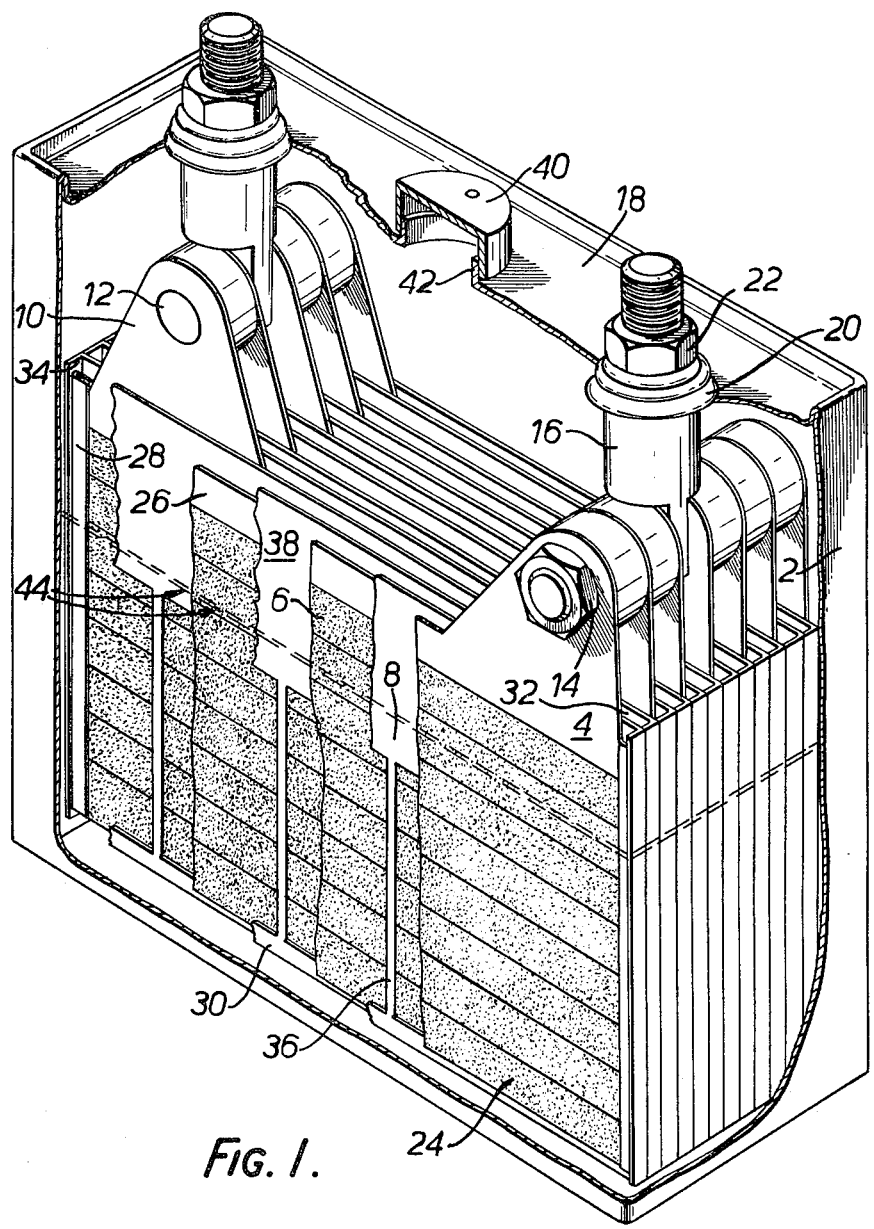
FIG. 1 is a perspective simplified diagrammaic view of a sealed alkaline cell in accordance with the invention, partially cut away for the sake of simplicity.

FIG. 1 shows an alkaline cell comprising a container 2 within which is a plurality of alternate positive and negative plates 4 and 6, each pair of which is separated by a composite separator 8. Each plate 4 and 6 is provided with an upstanding plate lug 10 in which an aperture is formed. The lugs of one polarity are arranged at one side of the cell, and those of the other polarity at the other side of the cell and each line of lugs is connected together by a bolt 12 and nut 14 and to a terminal pillar 16 which passes through the lid 18 of the cell where it is sealed by a sealing ring 20 and a nut 22 which engages the upper threaded portion of the terminal pillar.

Each plate is of conventional pocket type and includes a number of horizontal pockets 24 one above the other, in this case 16. Each pocket is a flattened perforated steel tube containing powdered active material, nickel hydroxide for the positive plates and cadmium hydroxide for the negative plates in the case of a nickel/cadmium cell, and the pockets are connected to each other and to an upper steel selvedge 26 which is integral with the plate lug 10 by steel side strips 28 which are bent around the ends of the pockets.

Figure 2:
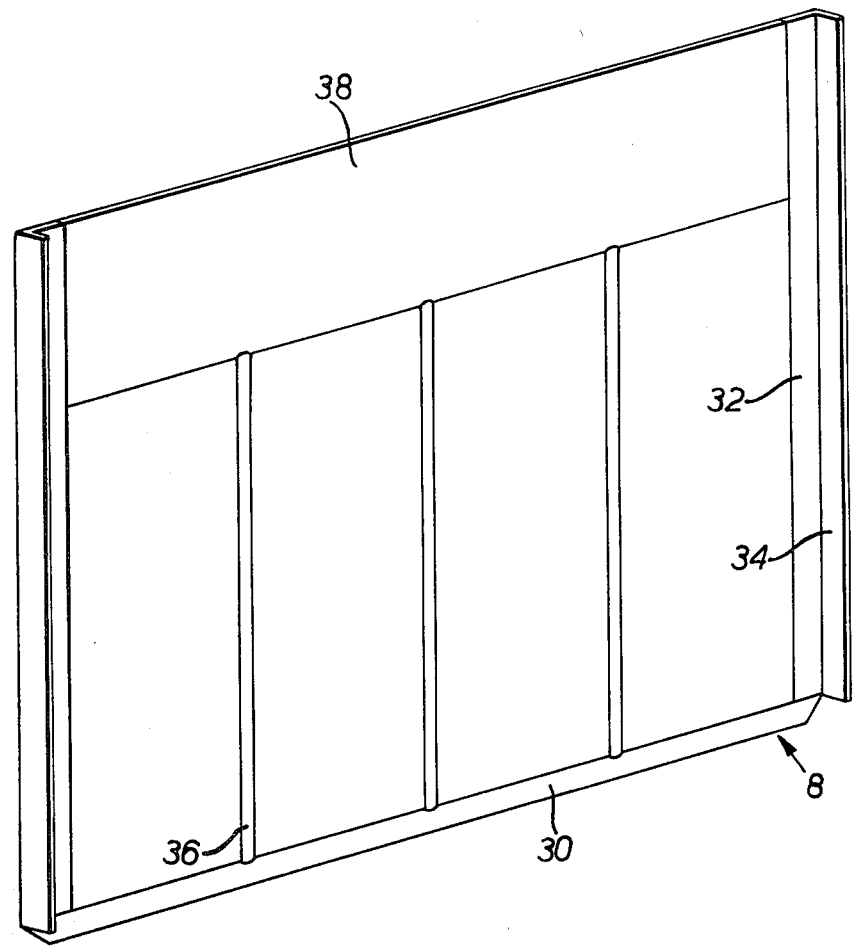
FIG. 2 is a perspective view of a single composite separator.

A single composite separator 8 is shown in more detail in FIG. 2 and comprises essentially a conventional so-called ladder separator, which constitutes the first separator means, extending across the top of which is a layer of absorbent material, such as felted or microporous polypropylene or nylon, which constitutes the second separator means. A conventional ladder separator comprises a generally rectangular planar framework of plastics material, such as polypropylene, with horizontal planar edge members 30 interconnected by two vertical side members 32, along the edge of each of which is a shallow flange 34 which projects out of a plane of the separator. The two horizontal members 30 are interconnected by a number, in this case three, of narrow spaced connector elements 36. In the present case, the upper horizontal edge member 30 and the upper portions of the connector elements 36 are absent, and in their place the strip of absorbent separator material 38 is located, e.g. by bonding to the edge members 32.

Centrally disposed in the lid 18 of the cell is a vent of Bunsen type comprising an upstanding hollow open-topped boss 42 which is integral with the lid 18. Fitted around the boss 18 is a resilient rubber cap 40 which is adapted to lift away from the boss and thus vent the interior of the cell at a predetermined low pressure, in this case 0.1 bar.

The flanges 34 on the separator are of approximately the same width as the positive and negative plates so that when the plates are assembled the flanges 34 form a substantially continuous surface on each side of the stack of plates and separators. The negative plates, which have a combined electrochemical capacity which is 10% more than that of the positive plates, are thus separated from the adjacent positive plates by a distance of about 0.5 mm by the side members 32, connector elements 36 and strip of absorbent separator material 38. The absorbent separator material 38 extends down nearly to the bottom of the third pocket of the positive and negative plates, and, when electrolyte is added to the cell, it is filled to a level shown by the dotted line 44, that is somewhat above the lower edge of the absorbent separator material. The latter thus absorbs electrolyte and by virtue of its capillarity maintains those pockets which are above the electrolyte level moist with electrolyte.

In use, those parts of the plates which are below the electrolyte level operate electrochemically in the conventional manner, whilst those parts above the electrolyte level are maintained moist with electrolyte by the absorbent separator material and thus also function conventionally. The resistance between the upper portions of the plates is somewhat increased by comparison with conventional cells, but the effect of this increase on the overall performance of the cell is very slight, i.e. of the order of one or two percent. When the cell is to be charged, it is connected to a constant potential charger. Towards the end of the charge, the charging current has dropped to a low level and oxygen is evolved at the positive plates. This passes through the moist absorbent separator material and recombines at the negative plates without significantly increasing the gas pressure within the cell. In normal operation the vent therefore never opens, and as a result no electrolyte is lost and the cell requires no maintenance.

Figure 3:
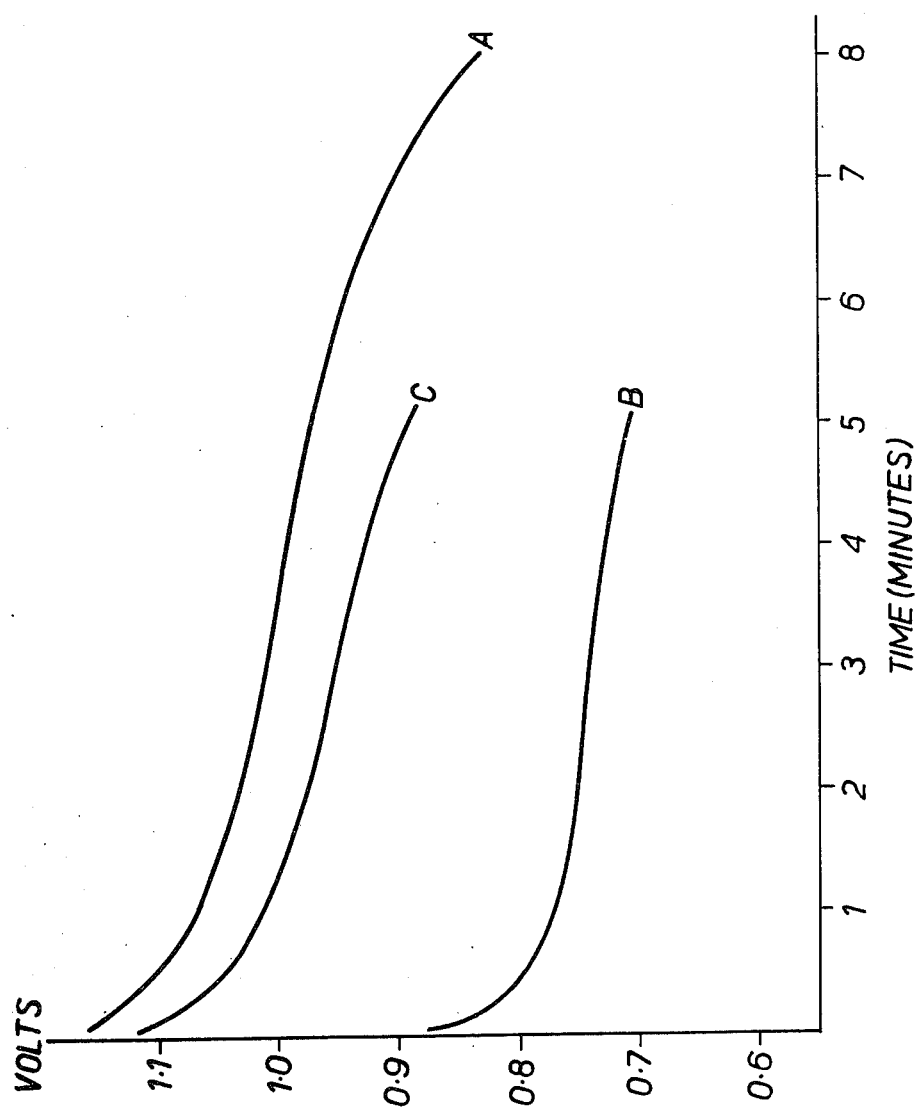
FIG. 3 is a comparative graph showing the high rate discharge characteristics of an alkaline cell in accordance with the invention and two alkaline cells of known type.

FIG. 3 shows the voltage characteristic of three different alkaline cells of pocket plate type all of which have the same number of pockets in the positive and negative plates when discharged at the 5C rate (i.e. total discharge should occur in 12 minutes). Curve A shows the characteristic of a cell with conventional separators of open type, such as ladder or pin type separators, curve B the characteristic of a cell with absorbent separators and curve C a cell in accordance with the invention using composite separators. The cell of curve B is of recombinant type in which recombination can be sustained at charging rates of up to C/30 but its voltage at high discharge rate is substantially lower than that of the cell of curve A. The cell of curve C can sustain recombination at charging rates of up to C/60, and perhaps as high as C/30, but its voltage is only minimally less than that of the cell of curve A. This slight loss in performance can be substantially eliminated by increasing the number of pockets in the negative plates, which extra plates are positioned opposite the lugs of the adjacent positive plate with interposed damp absorbent separator material thus slightly increasing the electrochemical and recombination performance of the cell.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. An electric storage cell of alkaline type, said cell comprising:
   (a) a container;
   (b) a plurality of alternate positive and negative electrodes disposed in said container, said positive and negative electrodes being conceptually divisible into upper and lower portions;
   (c) first separator means which separate the lower portions of adjacent electrodes and which leave a substantially unobstructed electrical path between said adjacent electrodes;
   (d) second separator means which separate the upper portions of adjacent electrodes, said second separator means comprising gas permeable absorbent material capable of conducting electrolyte by capillary action; and
   (e) a free electrolyte contained in said container and having a normal level which is above the bottoms of said second separator means and below the tops of said negative electrodes,
   whereby the lower portions of adjacent positive and negative electrodes are below the normal electrolyte level and operate electrochemically in the conventional manner and the upper portions of adjacent positive and negative electrodes are above the normal electrolyte level but kept moist with electrolyte by said second separator means and thus also operate electro-chemically in the conventional manner.

2. An electric storage cell as recited in claim 1 wherein between 5 and 25 percent of the active area of said electrodes is separated by said second separator means.

3. An electric storage cell as recited in claim 1 wherein said first and second separator means between each pair of adjacent electrodes are connected together to form a single composite separator.

4. An electric storage cell as recited in claim 1 wherein the electrochemical capacity of said negative electrodes is greater than the electrochemical capacity of said positive electrodes.

5. An electric storage cell as recited in claim 4 wherein between 5 and 100 percent more negative active material than positive active material is present.

6. An electric storage cell as recited in claim 1 and further comprising a vent adapted to vent the interior of said container at a pressure of between 0.05 and 0.5 bar.

7. An electric storage cell as recited in claim 1 wherein said first separator means is of the rod or pin type.

8. An electric storage cell as recited in claim 1 wherein said first separator means is of the ladder type.

9. An electric storage cell as recited in claim 1 wherein said first separator means is a thin plastic grid or net.

10. An electric storage cell as recited in claim 1 wherein said second separator means is composed of felted or microporous polypropylene or nylon.

11. An electric storage cell as recited in claim 1 wherein said second separator means is composed of resin-coated microfine glass fibers.

12. An electric storage cell as recited in claim 1 wherein said first separator means has an open area in excess of 75% of its total area.

13. An electric storage cell as recited in claim 12 wherein said first separator means has an open area in excess of 90% of its total area.

14. An electric storage cell as recited in claim 1 wherein said first separator means space said positive and negative electrodes apart by between 0.1 and 2 mm.

* * * * *